Patented Oct. 9, 1934

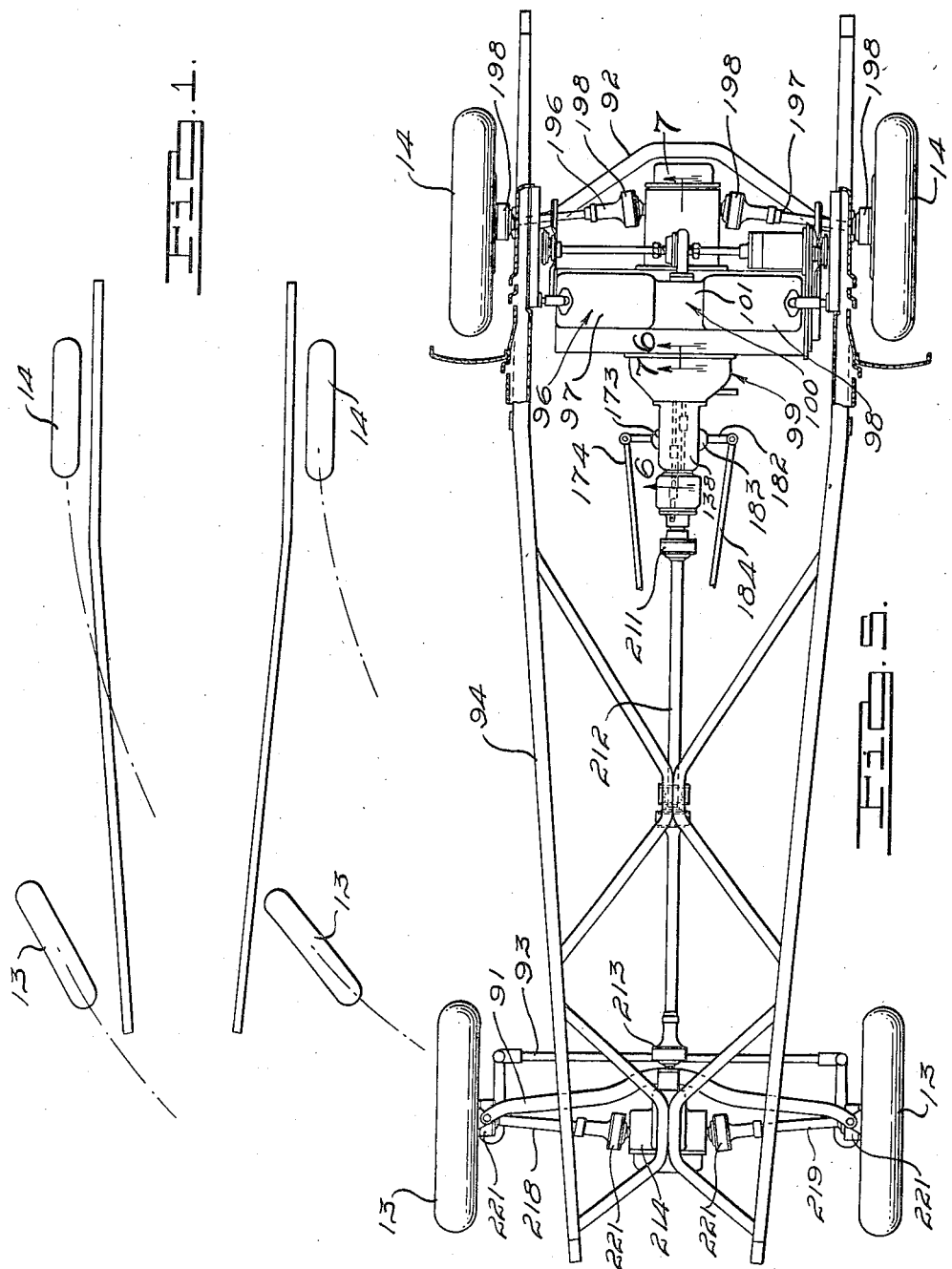

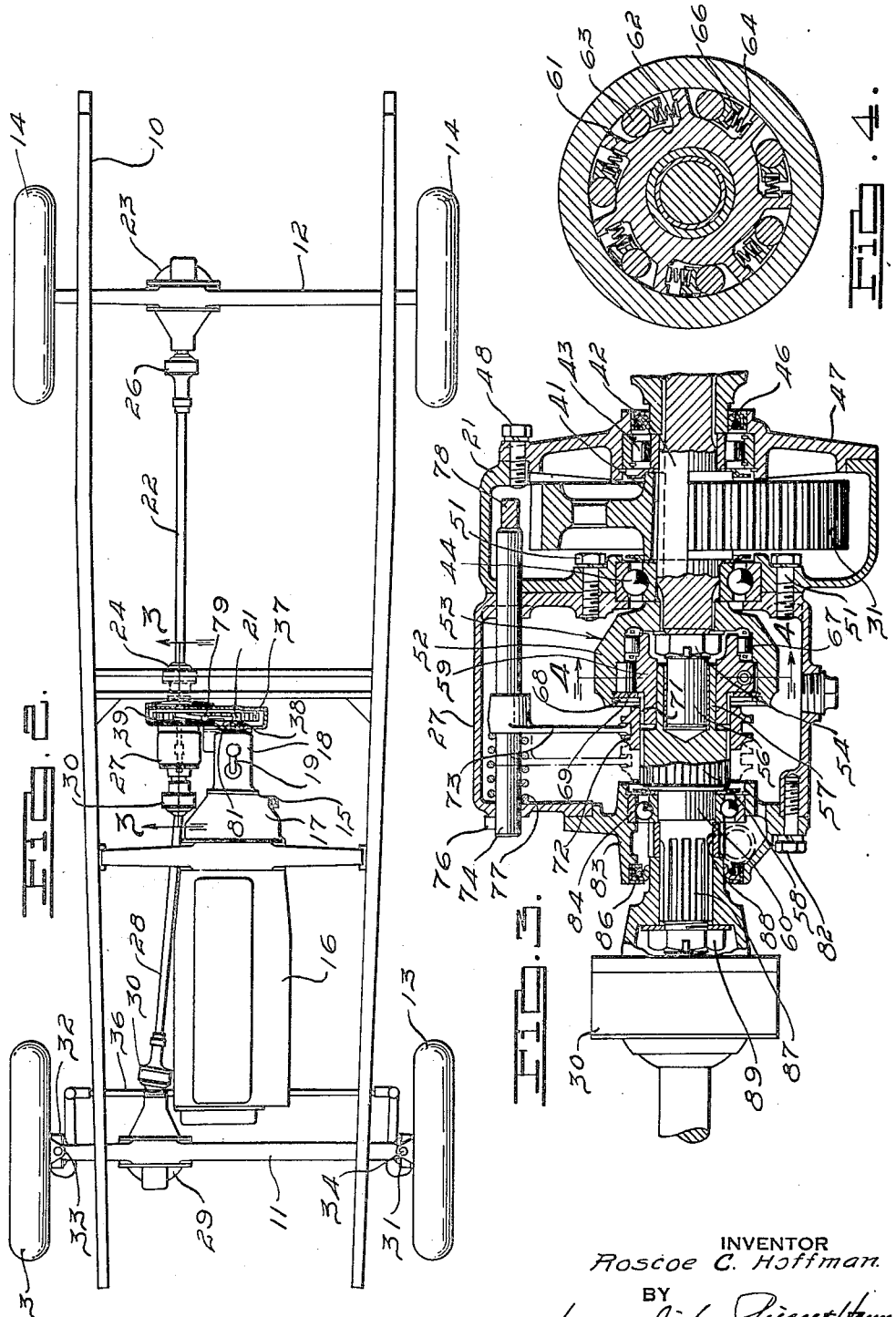

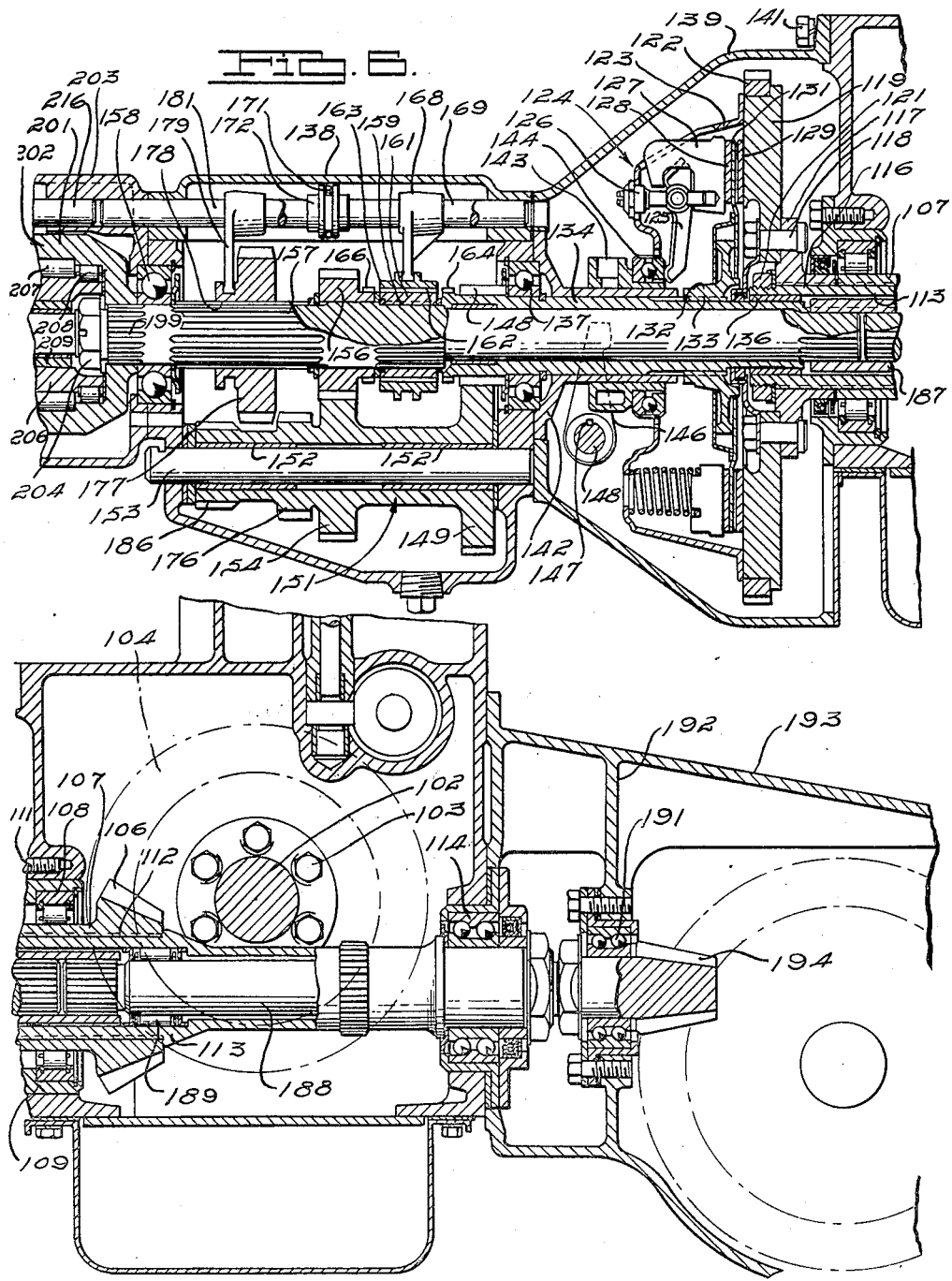

1,976,071

UNITED STATES PATENT OFFICE 1,976,071

MOTOR VEHICLE

Roscoe C. Hoffman, Detroit, Mich.

Application January 22, 1932, Serial No. 588,164

7 Claims. (Cl. 180—44)

This invention relates to motor vehicles and has particularly to do with motor vehicles having driven front and rear ground wheels.

Some of the more important objects of the invention are, to provide mechanisms for positively driving both the front and rear ground wheels of a motor vehicle during periods of operation when the peripheral speeds of such wheels are substantially equal but to permit the free wheeling of one of said pairs of wheels during conditions of operation when the peripheral speeds thereof become unequal; to provide means for constantly driving both the front and rear ground wheels of a motor vehicle at substantially uniform peripheral speeds while permitting one pair of such wheels to run at a greater peripheral speed than that at which it is driven when frictional contact with the road tends to rotate such wheels at a greater peripheral speed; to provide mechanism for driving both the front and rear wheels of a motor vehicle at a constant speed when the vehicle is moving in one direction and to drive only one pair of such wheels when the movement of the vehicle is in an opposite direction; to provide means for driving both the front and rear wheels of a motor vehicle in which the engine is mounted adjacent the rear wheels thereof; to provide a driving mechanism for the front and rear wheels of a motor vehicle in which means is provided for automatically disconnecting the driving mechanism from the front wheels when the motor vehicle is thrown into reverse gear; to provide a motor vehicle in which either a two or a four wheeled positive drive is optionally provided; and, in general, to provide a simple and practical transmission mechanism for motor vehicles in which it is desirable at times to apply the torque of the engine thereof to more than one pair of ground wheels.

The embodiments of the invention herein disclosed for the purpose of illustration comprise generally motor vehicles in one of which an engine is mounted over the rear motor vehicle wheels while in the other the engine is mounted in the region of the front wheels. In the vehicle in which the engine is mounted in the rear, it is positioned in substantially parallel relation to the rear axle whereas when mounted in front the engine is disposed substantially perpendicularly to the front axle. In either event, however, the vehicle is provided with engine power transmission mechanism by means of which both the front and rear pairs of vehicle ground wheels may be positively driven at substantially uniform peripheral speeds. Inasmuch as the peripheral speeds of the front wheels often tend to be greater than the speeds of the rear wheels, as when the vehicle is turning a curve, the transmission mechanism is provided with means for releasing the front wheels under such conditions, thus permitting their rotation at whatever speed may be demanded by frictional contact with the road. In order to prevent the front wheels from tending to drive the engine during the reverse movement of the vehicle, means is provided for automatically and entirely disconnecting the front wheels from the engine whenever the vehicle gear shift lever is moved into a vehicle reversing position.

In the accompanying drawings:

Fig. 1 is a diagrammatical view illustrating the position and path of travel of the front and rear wheels of a motor vehicle during its movement around a curve.

Fig. 2 is a plan view of a motor vehicle chassis in which an engine located adjacent the front axle is employed for positively driving both the front and rear vehicle wheels under certain conditions of operation.

Fig. 3 is a longitudinal sectional view of certain of the elements of structure embraced in Fig. 1 as they might appear substantially along line 3—3 thereon.

Fig. 4 is a cross-sectional view taken substantially on line 4—4 of Fig. 3.

Fig. 5 is a plan view of an automobile chassis having an engine located adjacent the rear axle thereof and which engine is employed in driving both the front and rear vehicle wheels under certain conditions of operation.

Fig. 6 is a longitudinal sectional view of the power transmission mechanism embraced in the structure disclosed by Fig. 5 as it might appear substantially in the plane of line 6—6 thereon.

Fig. 7 is a fragmentary transverse sectional view of the engine embraced in the motor vehicle disclosed by Fig. 5 as it might appear on line 7—7 thereon.

Referring particularly to Fig. 2, one form of the invention is embraced in a motor vehicle having a frame 10 which is resiliently mounted in any suitable manner upon front and rear axles 11 and 12 respectively. At the opposite ends of such axles front and rear ground wheels 13 and 14 respectively are mounted in the usual manner. Mounted on the frame 10 adjacent the front axle 11, but to the rear of and substantially perpendicular to such front axle, is an engine 16, the rear end of which terminates in the usual clutch and transmission housing 17 and 18 respectively. The clutch mechanism within the casing 17 is operated by a clutch lever 15 while the transmission for driving the vehicle at different speeds is controlled by a shift lever 19.

The rear end of the transmission casing 18 terminates in a transversely disposed driving gear casing 21 from one side of which projects a propeller shaft 22 by means of which the rear vehicle wheels are driven through a differential and other rear axle elements 23. The propeller shaft 22 has suitable universal couplings 24 and 26 connected therein by means of which a proper degree of flexibility is provided.

The front side of the gear casing 21 has connected thereto an overrunning clutch casing 27 from which extends a propeller shaft 28 having universal couplings 30 at opposite ends and one of which terminates in a front axle differential 29 from which the front vehicle wheels 13 are driven by conventional axle shafts having therein universal couplings 31 and 32. In order to render the front wheels 13 dirigible in operation the axle 11 is provided with pivotal couplings 33 and 34 which are controlled by a vehicle steering mechanism 36 of any well known construction.

Within the casing 21 is a gear 37 rigidly mounted on a main vehicle power shaft 38 which is driven by the engine at various speed ratios and in different directions depending upon the position of the gear shift lever 19. Such gear meshes with and drives another gear 39 located within the casing 21 and keyed, as indicated at 41, intermediate the ends of a shaft 42 which is journaled adjacent the gear in roller bearings 43 and 44 secured in the casing 21.

The rear end of the shaft 42 connects with the universal coupling 24, heretofore referred to, and the inner end of which runs inside of an oil sealing ring 46 mounted in an opening in the casing 21 through which a shaft 42 projects. Such ring is employed for the purpose of preventing the escape of oil from the casing around the shaft projecting therefrom. In order to obtain access to the gears 37 and 39 the rear side of the casing 21 is made removable as indicated at 47 by releasing stud bolts 48.

The casing 27, which is secured to the casing 21 by stud bolts 51, is provided with an opening for receiving the forward end of the shaft 42 and beyond which the shaft has splined on the end thereof the driving member 52 of an overrunning clutch 53. Within the driving member the shaft 42 has threaded thereon a nut 54 which, together with a nut (not shown) threaded on the opposite end thereof confines the various elements disposed upon the shaft in rigid relation. Beyond the nut 54 the shaft 41 terminates in a reduced or pilot portion 56 which is surrounded by and journaled in a cylindrical sleeve portion 57 extending from the splined end 58 of a shaft section 60. On the sleeve 57 is rotatably disposed the driven element 59 of the overrunning clutch 53.

Such element has a plurality of substantially radially disposed lugs 61 projecting therefrom, the ends of which have sliding contact with the inner cylindrical surface of the clutch driving member 52 while between the lugs are formed a plurality of arcuate surfaces 62, the centers of curvature of which are disposed at corresponding distances and angles remote from the center of curvature of the interior cylindrical surface of the driving member 52. Between such surfaces and interior cylindrical surface of the driving member 52 are located a plurality of cylindrical rollers 63 the diameters of which are such that the rollers will be clamped or confined between the driving and driven members 52 and 59 respectively when the shaft 41 is rotated in one direction and will be released between such members when the shaft is rotated in the opposite direction. Tending to urge such rollers into positions where they will be clamped between the aforesaid driving and driven members are springs 64 which are confined between the lugs 61 and follower members 66, the surfaces of which adjacent the rollers 63 are formed arcuately to fit and to seat against the rollers.

Inside the rollers 63 are disposed a plurality of rollers 67 which cooperate with concentric cylindrical surfaces formed on the exterior and interior of the driven and driving members of the clutch 53 to provide an ordinary roller bearing.

In order to prevent the escape of the rollers 63 from between the lugs 61 the outer end of the driving element 52 is provided with a split retaining ring 68 behind which an annular retaining disc 69 is confined against the outer ends of the rollers.

The outer end of the driven clutch member 59 has a splined portion 71 adjacent and corresponding to the splined portion 58 of the shaft 60. Disposed upon the aforesaid splined portion of the driven clutch element 59 and the shaft 60 is a shift ring 72 having a groove in the outer surface thereof for receiving the forked end of a yoke 73. The upper end of the yoke is mounted on a rod 74 slidably disposed in a plurality of aligned openings formed in the upper opposite sides of the casing 27 and in the adjacent wall of the casing 21. Outside of the casing 27 the rod 74 is provided with a stop 76 adapted to abut the casing 27 and to limit the movement of the shift ring 72 beyond a position wherein it is substantially half in engagement with the splined end 71 of the driven clutch element 59 and half in engagement with the splined portion 58 of the shaft 60. A spring 77 surrounding the shaft 74 and disposed between the yoke 73 and the side of the casing 27 adjacent the stop 76 tends to maintain the stop in abutting relation to the casing and the shift ring 72 in the previously referred to position.

It is apparent, when the shift ring 72 is thus operatively disposed and the driving element 52 of the clutch 53 is rotated in a proper direction, that the shaft 60 will be driven by the shaft 42 through the shift ring.

In order to move the shift ring 72 over upon the splined surface 58, in which position the driven element 59 will be free to so rotate upon the sleeve 57 that neither of the shafts 42 or 60 can drive the other, the rod 74 may be shifted against the compression of the spring 77 by a lever 78 pivotally mounted as indicated at 79 within the casing 21. One end of the lever 78 engages the end of the rod 74 extending within the casing 21 while the opposite end thereof is engaged by an end of a shaft 81 projecting outwardly into the casing 21 from the casing 18 and which is moved rearwardly by the operation of the shift lever 19 when the latter is actuated in such manner as to place the mechanism within the casing 18 in position to drive the motor vehicle rearwardly.

The front end of the casing 27 has removably secured thereto by stud bolts 82 a cap 83 through which the forward end of the shaft 60 projects and is journaled in a bearing 84. In order to prevent the escape of lubricating oil from the casing 27 the outer extremity of the cap 83 is provided with an oil retaining ring 86, the inner periphery of which engages a section of one of the universal couplings 30 projecting therein. Such section is internally splined to fit over the externally splined and reduced end 87 of the shaft 60 and is retained rigidly against a collar 88 on the reduced end 87 by a nut 89 on the threaded end of the latter.

In the structure disclosed by Fig. 5 the front and rear motor vehicle wheels 13 and 14 respectively are rotatably mounted at the ends of axles 91 and 92 and are provided with a steering mechanism 93 by which the wheels may be turned at an angle with respect to the rear wheels to guide the vehicle in any desired direction. A frame 94 of slightly different form than the frame 10 employed in the structure disclosed by Fig. 2 is resiliently mounted at opposite ends upon the axles 91 and 92. Adjacent the rear of the frame 94 and generally parallel the axle 92, although somewhat in front of the latter, is located an engine 96 which comprises a pair of cylinder blocks 97 and 98 between which a vehicle driving mechanism 99 is arranged.

The blocks 97 and 98 have a unitary crank casing 100 consisting of a middle compartment 101 having compartments on opposite sides thereof for containing the crank shaft and mechanism for operating the pistons associated with the cylinder blocks 97 and 98. Such crank shaft has a section 102 extending through the middle compartment 101 of the crank case 100 and on which is mounted by bolts 103 a spiral tooth bevel gear 104. Disposed in a vertical plane perpendicular to the axis of the shaft 102 and somewhat below the latter is a correspondingly beveled pinion 106 which meshes with the spiral beveled gear 104 and is driven by the latter upon rotation of the crank shaft 102. The pinion 106 has a sleeve 107 projecting therefrom through a roller bearing 108 which is mounted in a removable ring 109 secured by screws 111 in an opening in a front portion of the middle section 101 of the crank case 100. The interior surfaces of the gear 106 and the sleeve 107 are splined as indicated at 112 upon the exterior surface of a tubular shaft or sleeve 113, one end of which extends beneath the shaft 102 and is journaled in a bearing 114 secured in an opening in the rear side of the crank case middle section 101. The opposite end of the sleeve 113 extends through and beyond the forward end of the sleeve 107 of the gear 106 and there has splined thereon, as is indicated at 116, a flanged ring 117 having secured thereto by bolts 118 the inner periphery of a disc or fly wheel 119. The fly wheel 119 and the gear 106 are secured rigidly against an outwardly projecting shoulder portion of the sleeve 113 by a nut 121 threaded upon the end of the latter against the adjacent surface of the flanged ring 117. It is apparent that rotation of the gear 104 will positively rotate the fly wheel 119 through the gear 106, the sleeve 113 and the flanged ring 117.

Rigidly mounted on the outer edge of the fly wheel 119 is a ring gear 122 adapted to mesh with a pinion of a motor starting device (not shown), while the forward surface thereof has secured thereto the outer edge of an assembly housing 123 of a friction clutch 124. Projecting inwardly from the clutch housing 123 are supporting studs 126 on which are pivoted radially disposed levers 125 on the outer ends of which is supported a clutch backing ring 127. Secured on the adjacent surfaces of the clutch backing ring and the disc 119 are friction rings 128 and 129 between which is disposed the outer edge of a clutch disc 131. Such disc is secured rigidly at its inner periphery on a flanged ring 132 which is splined as indicated at 133 on an intermediate portion of a hollow shaft 134. A bushing 136 disposed inside of the adjacent end of the sleeve 113 rotatably receives one end of the tubular shaft 134, while the opposite end thereof is mounted in a bearing 137 secured in an opening in a vehicle transmission housing 138. Such housing is supported by bolts (not shown) upon the front end of a clutch casing 139 which in turn is secured at the opposite extremity thereof by bolts 141 to the front surface of the crank case 100.

The transmission housing 138 also supports a flanged sleeve 142 which projects within the clutch casing 139 and there rotatably and slidably receives an intermediate portion of the tubular shaft 134. Slidably disposed on this collar is a clutch shift ring 143 having a ball bearing 144 mounted thereon, one face of which is adapted to be engaged by the inner extremities of the radially disposed levers 125. The position of the ring 133 is controlled by a clutch yoke 146 disposed on opposite sides thereof and which is keyed, as is indicated at 147, to a clutch shaft 148 journaled at opposite ends in bearings formed in the clutch casing 139. Such shaft of course extends outwardly of the casing 139 at one end and is there operatively associated for rotational movement with suitable rods and levers (not shown), the position of which is controlled by a clutch pedal located in the passenger compartment of the vehicle.

When the clutch pedal is so moved as to shift the ring 143 rearwardly, the resultant engagement of the bearing 144 with the levers 125 will move the backing ring 127 away from the disc 119, thus permitting the rings 128 and 129 to rotate freely without carrying with them the disc 131. However, when the shift ring is moved in the opposite direction the disc 131 will be confined between the friction rings 128 and 129 and the rotation of the tubular shaft 134 with the sleeve 113 will result.

Beyond the bearing 137 the tubular shaft 134 is provided with externally disposed gear teeth 148 which continuously mesh with one of the gears 149 of a cluster of reduction gears 151. Bushings 152 disposed within the reduction gears 151 rotatably support the latter upon a shaft 153, the opposite ends of which are journaled in aligned bearings formed in the transmission housing 138 in parallel relation to the axis of the tubular shaft 134. Another gear 154 of the cluster 151 meshes with a gear 156 which is rotatably mounted on an intermediate portion of a shaft 157, one end of which is journaled within the tubular shaft 134 and extends slightly beyond the opposite end of the latter, while the opposite end thereof is journaled in a bearing 158 mounted in an opening in the forward end of the transmission housing 138. Between the gear 156 and the end of the tubular shaft 134, is splined to the shaft 157, as is indicated at 159, a driving ring 161 which in turn has splined on the exterior surface thereof, as indicated at 162, a slidable shift ring 163. Formed on the adjacent end of the tubular shaft 134 are clutch teeth 164 which are adapted to mesh with the internally splined surface of the shift ring 163, when the latter is moved rearwardly, for directly driving the shaft 157 with the tubular shaft 134 through the shift ring 163 and the driving ring 161.

Beyond the opposite end of the shift ring 163, and integral with the gear 156, are gear teeth 150

166 similar to the gear teeth 164 and likewise adapted to mesh with the internally splined surface of the shift ring 163 when the latter is moved forwardly. Under such conditions the tubular shaft 134 will drive the shaft 157 through the gear 149, the gear 154, the gear 156, the shift ring 163 and the driving ring 161.

The shift ring 163 may be moved between either of these two positions by a shift bracket 168 which runs in a groove thereabout and which is supported rigidly upon a shaft 169, slidably mounted at its opposite ends in bearings in the transmission casing 138 and operable by a shifting lever 171 engaging the shaft between two spaced collars 172. The shifting lever 171, which is journaled in a bearing 173 formed in the side of the housing 138, is connected at its outer end by a rod 174 to a main gear shift lever within the vehicle and accessible to the vehicle operator.

The ratio of gears 148, 149, 154 and 156 is such as to drive the shaft 157 at somewhat lower speed than when it is driven directly by the clutch teeth 164 or, namely, at intermediate speed.

In order to provide means for driving the shaft 157 at a still lower speed or, namely, at low speed, the cluster 151 is provided with a relatively small gear 176 which is adapted to mesh with a gear 177 slidably mounted and splined as indicated at 178 on the shaft 157. The latter gear may be shifted into or out of mesh with the gear 176 by a shifting bracket 179 adapted to run in a groove formed in the side of the gear 177 and secured rigidly on a shaft 181 mounted slidably beside the shaft 169 in bearings formed in the transmission housing 138. Such shaft may be shifted to bring the gear 177 either into or out of mesh with the gear 176 by a shifting lever 182 secured between spaced rings (not shown) but similar to the rings 172 on the shaft 169. An intermediate portion of the shifting lever 182 is mounted in a bearing 183 formed in the side of the housing 138, while the outer end thereof is connected by a rod 184 to the aforesaid main gear shifting lever located within the vehicle.

The gear 177 may also be shifted into such position as to reverse the direction of rotation of the shaft 157, and consequently the direction of motion of the vehicle, under which condition it engages an idling gear (not shown) which in turn meshes with a gear 186 of the cluster 151.

For driving the rear ground wheels 14 the shaft 157 is splined beyond the end of the tubular shaft 134 for operative engagement with a coupling sleeve 187 which in turn engages the splined and reduced end of a shaft 188 disposed within and projecting beyond the end of the sleeve or tubular shaft 113. One end of the shaft 188 is journaled inside the sleeve 113 by means of a roller bearing 189, while the opposite end thereof is journaled in a bearing 191 located in a web portion 192 of a differential housing 193 secured to the rear side of the crank case 100. Beyond the bearing 191 the shaft 188 is provided with a driving pinion 194 which is so associated with a system of gears within the differential housing 193 as to drive the rear wheels 14 through a pair of oppositely disposed axial shafts 196 and 197. Universal couplings 198 operatively associated with the propeller shafts 196 and 197 provide a proper degree of flexibility between the wheels 14 and the differential housing 193.

For driving the front ground wheels 13, the opposite end of the shaft 157 is also splined, as is indicated at 199, for operatively engaging the driving element 201 of an overrunning clutch 202 disposed within an auxiliary clutch casing 203 secured upon the front end of the transmission housing 138. The driven element 201, like the driving element 52 of the overrunning clutch 53 illustrated by Fig. 3, is secured on the end of the shaft 157 by a nut 204 and has a driven element 206, rollers 207, a roller bearing 208, a splined auxiliary shaft 209 and a shift ring (not shown), all of which elements are similar to the corresponding elements illustrated by Fig. 3 and are employed in driving a universal coupling 211 at one end of a front drive propeller shaft 212. The opposite end of such propeller shaft is connected through a universal coupling 213 to a front axial differential 214.

The shift ring of the overrunning clutch 202 is operated by a shifting bracket similar to the bracket 73 disclosed by Fig. 3 and which is mounted on a shifting shaft 216 provided with a limiting lug and a spring and otherwise mounted in the casing 203 in the same manner that shaft 74 is mounted in the casing 27. However, instead of being engaged by a lever 78 such as that by which the end of the shaft 74 is engaged, the position of the bearings in which the shaft 216 is mounted is such that the rear end of the shaft is engaged by the end of the low and reverse shifting shaft 181 when such shaft is moved into such position as to reverse the direction of rotation of the shaft 157. When the shifting shaft 181 is moved into such position as to drive the shaft 157 at low speed, the end of such shaft and the adjacent end of shaft 216 simply separate during such movement. However, when the vehicle is reversed the shaft 216 is so moved by the shaft 181 as to move the shift ring with which it is associated to entirely disconnect the shaft 157 from the propeller shaft 212 under any and all conditions of operation.

The front axle differential 214 is operatively connected to the wheels 13 by a pair of branch propeller shafts 218 and 219 in which universal joints 221 are employed for giving the drive a proper amount of flexibility under the conditions of operation under which it is employed.

The structure disclosed by Fig. 1 represents a vehicle, the front wheels of which are turned at an angle to the rear wheels in such manner as to drive the vehicle around a curve in the road. It is apparent from an inspection of this view and the dot and dash lines shown therein representing the paths of the respective vehicle wheels that the distance traveled by the front wheels in rounding such curve is materially greater than the distance traveled by the rear wheels. Under such circumstances the overrunning clutches 53 and 202 by which the vehicles disclosed herein are driven will permit the front vehicle wheels to run at any peripheral speed greater than that of the rear wheels without interfering with the operation of the vehicle. When the front wheels are again straight or, in other words, when the peripheral speed of the front wheels is substantially the same as that of the rear wheels, the front wheels as well as the rear wheels will be driven by their respective propeller shafts which are then operatively driven through the overrunning clutches.

Should the direction of motion of the vehicle be reversed and the front wheels be positioned at an angle relative to the rear wheels, as indicated by Fig. 1, the overrunning clutches associated with the front propeller shaft cannot become operative by reason of the greater peripheral speed of the front wheels because the front propeller shafts are entirely disconnected from the engine under any and all circumstances by the operation of the shafts 74 and 216 when the gear shift levers within the vehicles are thrown into such position as to reverse the direction of vehicular movement.

While the structure as herein disclosed constitutes a preferred form and application of the invention, it is to be understood that other structures differing widely from that herein disclosed are within the scope of the invention as defined by the appended claims.

I claim:

1. A motor vehicle comprising a plurality of groups of ground wheels, means for positively driving one of said groups for moving said vehicle either forwardly or rearwardly, means for positively driving another of said groups forwardly when the peripheral speeds of the wheels of said groups are substantially equal to the peripheral speeds of the wheels of the first mentioned group and automatic means for disconnecting said wheels of said second group when the peripheral speeds thereof tend to be greater than the peripheral speeds of the wheels of said first mentioned group when the vehicle is moving in one direction, and manual means for disconnecting said second group when said vehicle is moving in the opposite direction.

2. A motor vehicle comprising a gear shift lever, an engine and two pairs of ground wheels drivable thereby, means for driving one pair of said ground wheels from said engine when said gear shift lever is in one vehicle driving position and means responsive to the operation of said gear shift lever for disconnecting said one pair of ground wheels from said engine when said gear shift lever is in another vehicle driving position.

3. A motor vehicle comprising front and rear ground wheels, an engine and a gear shift lever, means connecting all of said wheels to said engine when said gear shift lever is in one position, means for driving said rear wheels in a reverse direction when said gear shift lever is in a different position and means operated by said gear shift lever for disconnecting said front wheels when said lever is in the last mentioned position.

4. A motor vehicle comprising front and rear ground wheels and an engine having a crank case, a power shaft intersecting said crank case and extending forwardly and rearwardly therefrom, means for driving said rear vehicle wheels from the rearwardly extending end of said power shaft, means for driving said front vehicle wheels from said forwardly extending end of said power shaft, an overrunning clutch in said last means and means for rendering said overrunning clutch inoperative for driving purposes.

5. A motor vehicle comprising front and rear ground wheels and an engine having a crank case, a power shaft intersecting said crank case and extending forwardly and rearwardly therefrom, means for driving said rear vehicle wheels from the rearwardly extending end of said power shaft, means for driving said front vehicle wheels from the forwardly extending end of said power shaft, an overrunning clutch in said means for driving said front vehicle wheels and means for disconnecting said front vehicle wheels from said driving means when the motion of said vehicle is in a reverse direction.

6. A motor vehicle comprising front and rear ground wheels, an engine having a crankcase, a tubular power shaft interposed in said crankcase and journaled in bearings disposed on opposite sides thereof, means for driving said power shaft from said engine, a propeller shaft having front and rear sections with the rear section thereof extending through said tubular power shaft and said crankcase, means for driving the rear section of said propeller shaft by said tubular shaft at variable speed ratios and in opposite directions, an overrunning clutch between said propeller shaft sections for driving said front section from said rear section and for releasing said two shaft sections when the speed of the front shaft section exceeds the speed of the rear shaft section, means for driving said front ground wheels from said front shaft section and means associated with a portion of said rear shaft section extending beyond said crankcase for driving said rear ground wheels.

7. A motor vehicle comprising front and rear ground wheels and an engine, said engine having front and rear power shafts respectively for driving said wheels, means responsive to the operation of the engine for driving said front and rear power shafts from said engine at variable speeds and in opposite directions, a gear shift lever for controlling said means, an over-running clutch in said front power shaft section and a manually connectable and disconnectable clutch in said front power shaft section and means responsive to the operation of said gear shift lever for either releasing or engaging said last mentioned clutch.

ROSCOE C. HOFFMAN.